Feb. 17, 1959 E. F. CAVANAUGH 2,874,219
REMOTE CONTROL DICTATING APPARATUS
Filed Dec. 13, 1954 7 Sheets-Sheet 1

INVENTOR.
EDWARD F. CAVANAUGH
BY C. G. Stratton
ATTORNEY

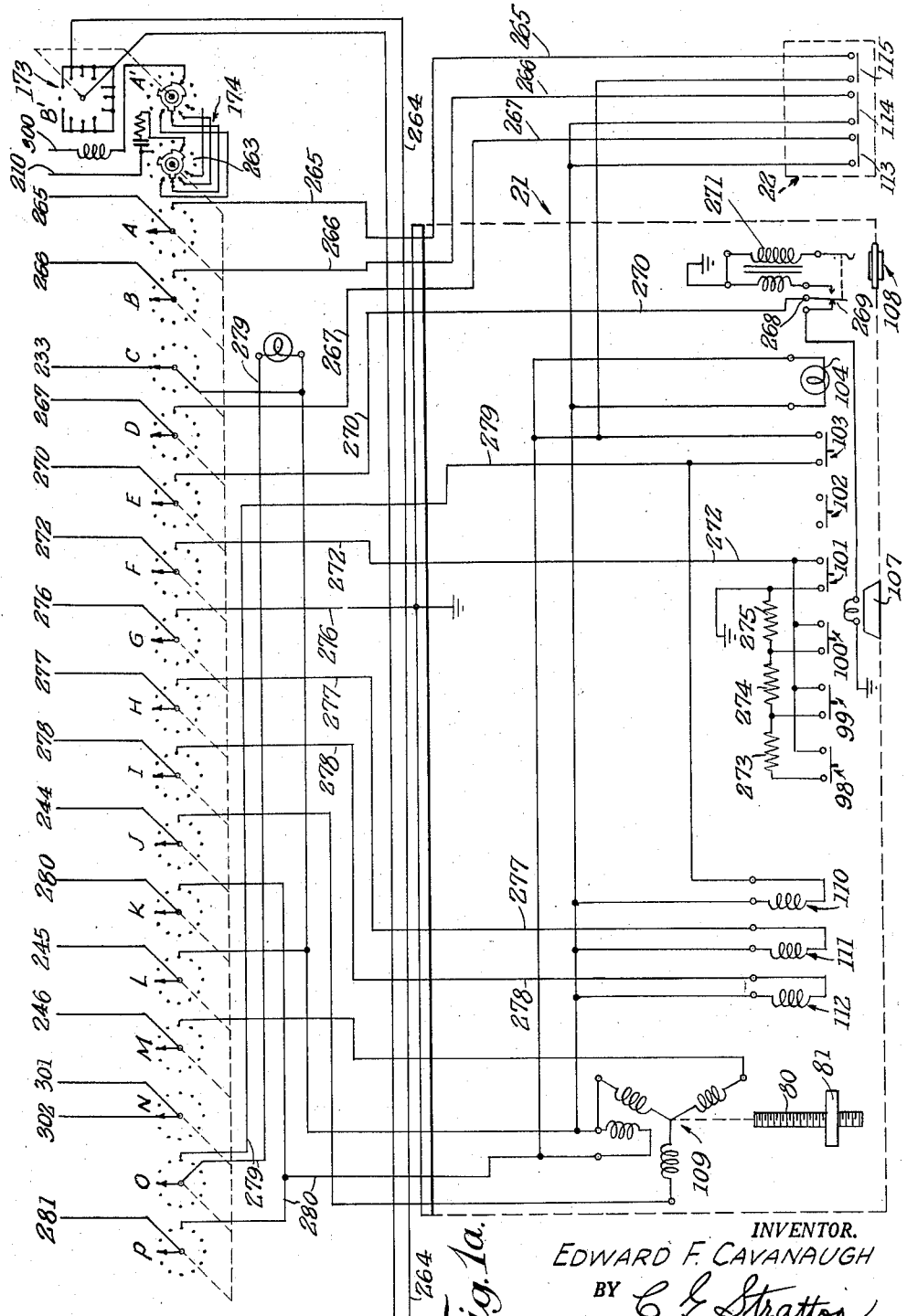

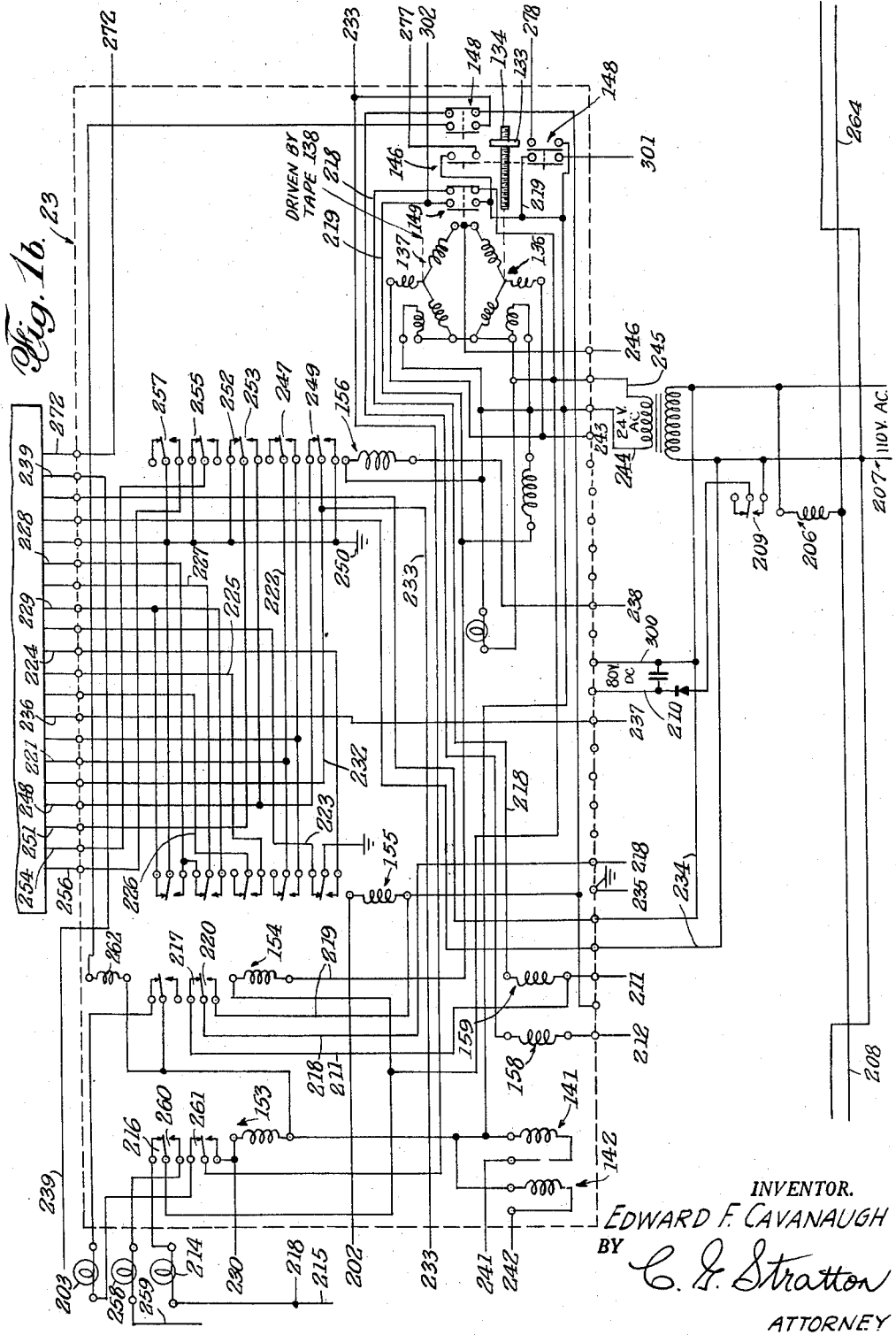

Feb. 17, 1959     E. F. CAVANAUGH     2,874,219
REMOTE CONTROL DICTATING APPARATUS
Filed Dec. 13, 1954     7 Sheets—Sheet 4
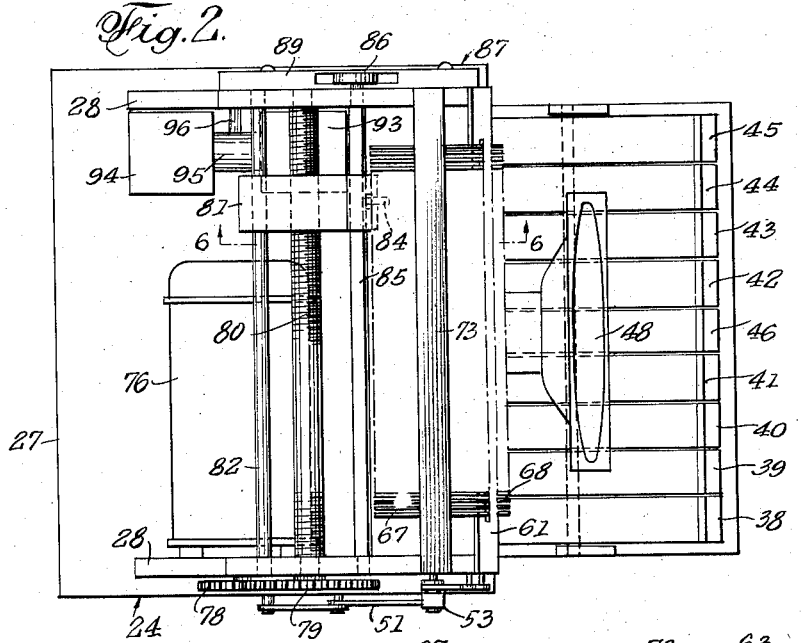
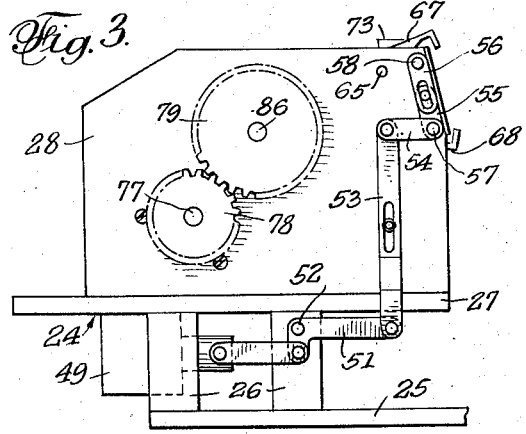
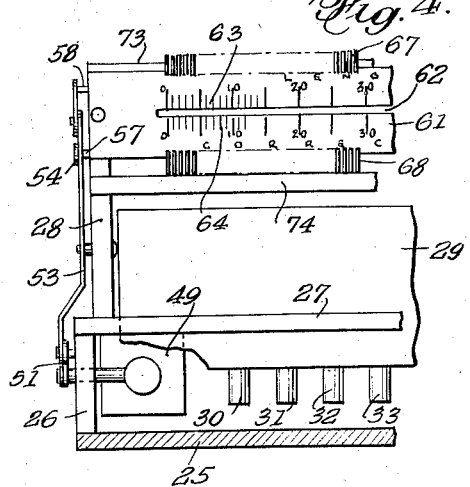
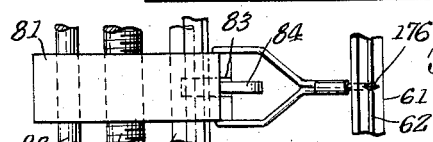
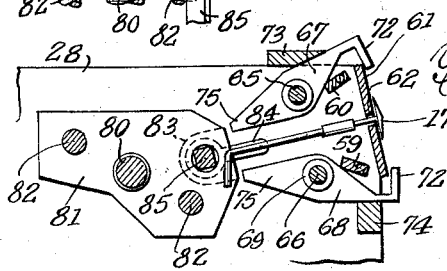
INVENTOR.
EDWARD F. CAVANAUGH
BY
ATTORNEY Feb. 17, 1959     E. F. CAVANAUGH     2,874,219
REMOTE CONTROL DICTATING APPARATUS
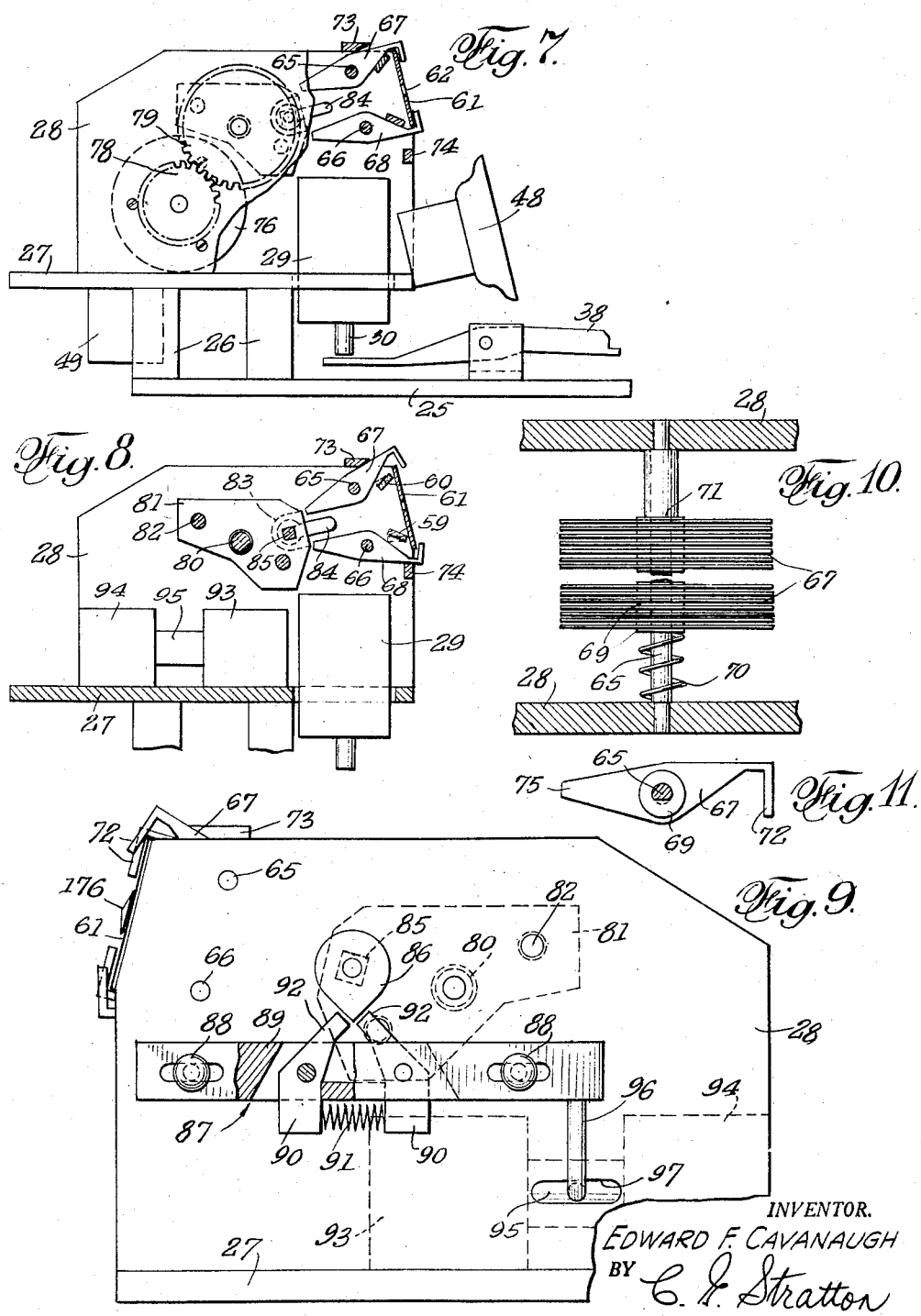
INVENTOR.
EDWARD F. CAVANAUGH
BY C. F. Stratton
ATTORNEY

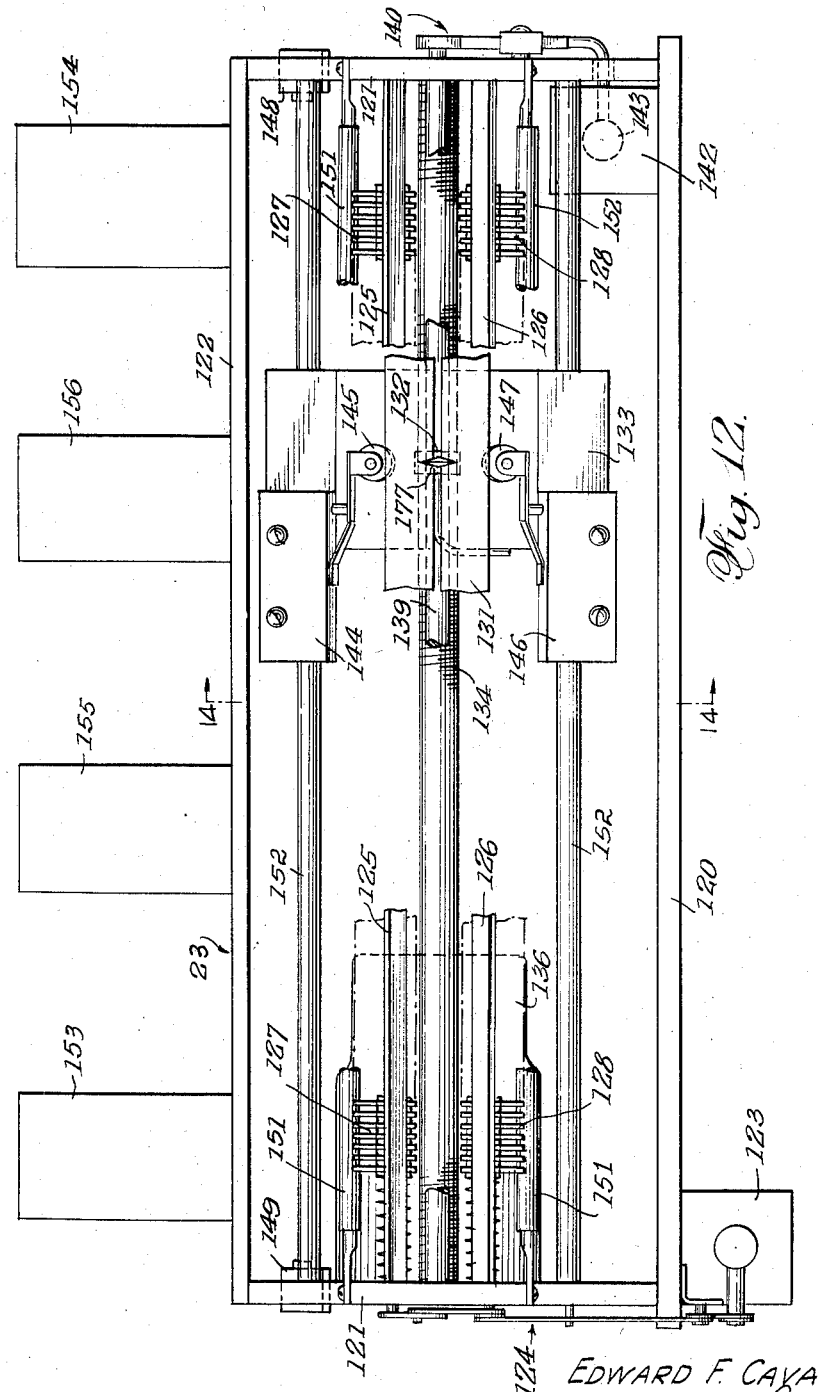

Feb. 17, 1959    E. F. CAVANAUGH    2,874,219
REMOTE CONTROL DICTATING APPARATUS
Filed Dec. 13, 1954    7 Sheets-Sheet 7
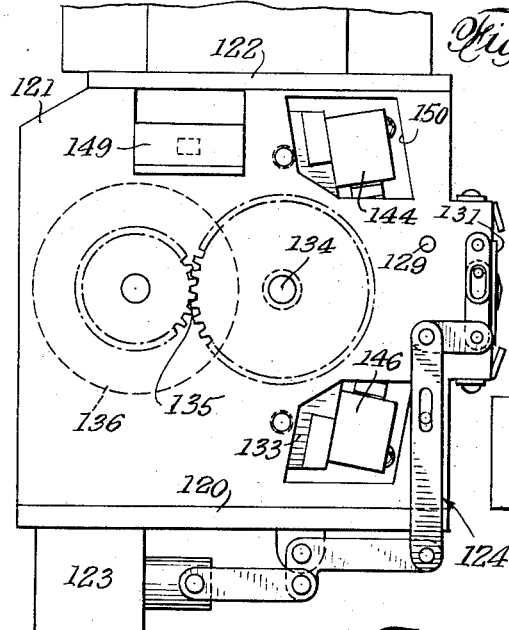
Fig. 13.
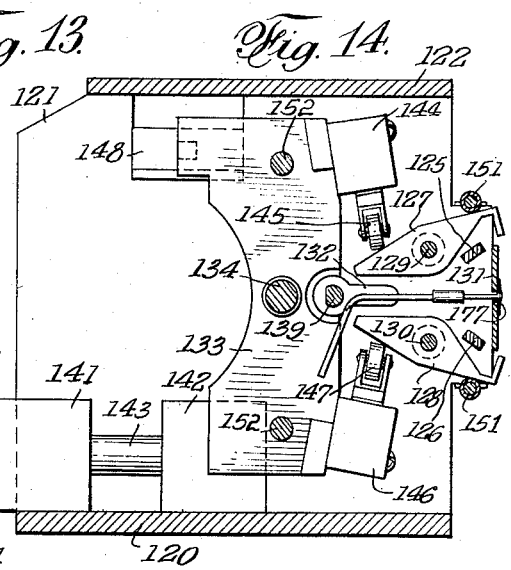
Fig. 14.
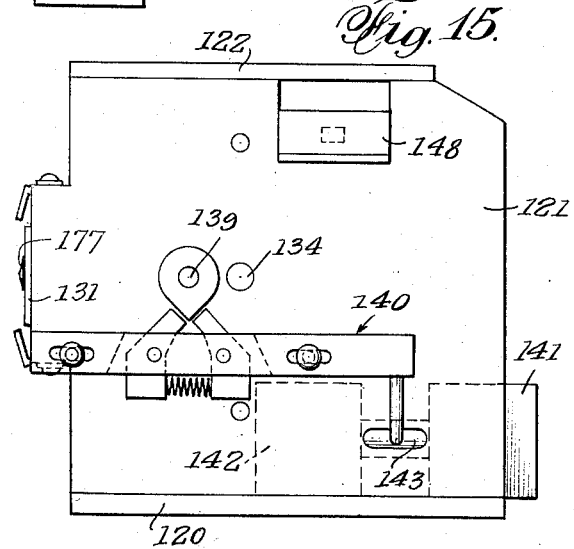
Fig. 15.
Fig. 16.
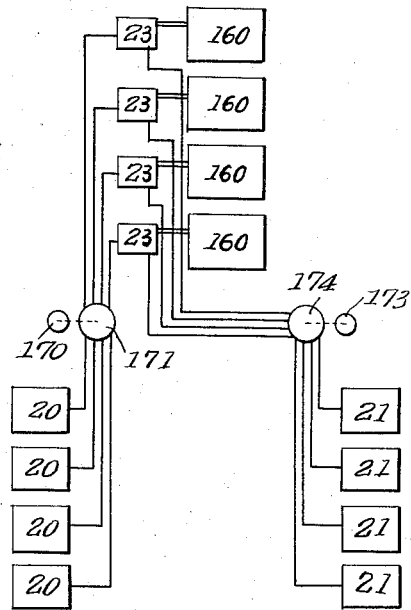
Fig. 17.
INVENTOR.
EDWARD F. CAVANAUGH
BY C. G. Stratton
ATTORNEY či# 2,874,219

REMOTE CONTROL DICTATING APPARATUS

Edward F. Cavanaugh, Long Beach, Calif., assignor to Executary Corporation, Long Beach, Calif., a corporation of California Application December 13, 1954, Serial No. 474,665

25 Claims. (Cl. 179—6)

This invention relates to a dictating or secretarial system or apparatus and has for its primary object to provide an interconnected group of units for dictating letters or memoranda, recording such dictation, and transmitting such recorded dictation so the same may be transcribed as on a typewriter.

The system further contemplates means to record the length of a letter or memorandum and also the number and location of any changes or errors there may be in such communications to, thereby, apprize the person transcribing the same of any such condition in the dictation.

A brief exposition of the system or apparatus generally will, at this time, clarify the following more detailed description of the construction, mode of operation, etc. of the component parts of the present apparatus.

The present apparatus is composed, essentially, of three basic pieces of equipment, which may or may not be unitary. These pieces are an executive's unit, a secretary's unit, and a master recording unit. It will be understood that the present apparatus may comprise a plurality of similar executive's units as well as a plurality of recording and secretary's units, switching being provided for operatively connecting the units as hereinafter indicated.

The executive's unit is of compact form and may ordinarily occupy a place on the desk of an executive or other person who may use same. As an aid to economy of motion and thereby to save time, all controls of this unit are of the key type and the keys are arranged as a single row or bank so that only one type of mechanical operation is required in order to perform a dictation function. Thus, a key is pressed to initiate dictation, another to listen back to previous dictation, a third to indicate the length of a letter, a fourth to show correction in dictation, etc., etc.

In all, eight operating keys are provided and, in addition to these, the executive is concerned only with a scale type dial on which is shown the progress of the dictation. This dial indicates the dictating time used, the number of different letters dictated, the length of each letter, any corrections that have been made in the dictation, and the location of such correction or corrections in the context of the dictation. A ninth key, preferably placed centrally of the eight operating keys, actually is a dummy and is used as an indication light which shows when the executive's unit is in operation.

The secretary's unit is similar to the executive's unit, except that the same is provided with four operating keys and a dictator light key similar to the dummy key of the executive's unit. The secretary, or other person using the secretary's unit, has available foot-operated means that control operations most frequently used, thus permitting continuous use of the hands for typing. Any of the various available types of earphone listening devices may be provided for the secretary, or a desk unit speaker may be provided, depending on personal preference and/or surrounding noise conditions.

The master recorder unit or station may be fully automatic and may occupy any convenient place in an office, or may be located in an out-of-the-way place, as in a closet.

This unit is provided with a plurality of recorders, such as tape recorders, a memory device, and an automatic selector mechanism.

The recorders may be of any suitable commercial magnetic tape type, the same being preferably modified so as to permit remote control of all of the recording functions. The number of recorders that may be used in a master station will depend on the requirements of the office in which the installation is made. The number may vary from two for small offices to as many as fifty or more for large offices that use centralized stenographic departments.

The memory device is an important component of the recorder and of the present invention; the same permits the present apparatus to be remote-control operated. This memory device collects and records the signals from an executive's unit pertaining to length of letters, corrections, etc. The same holds or stores such information until the secretary or transcriber requires the same, at which time the secretary's unit is set up in conformance with the information recorded on the master recorder during dictation. Thus, the secretary, before beginning transcription, is apprized of the exact length of a letter, the location of and corrections that have been made, and the total length of a plurality of letters and/or memoranda from any executive. Such information enables the secretary to space letters properly on the paper, to listen to and make corrections before typing a letter, and to so control the secretary's unit as to enable most efficient operation.

The automatic selector of the master recorder comprises a series of relays and solenoid-operated selector switches and the same is used to automatically select an unused channel (tape recorder) for the executive when dictation is to be initiated. In a like manner, the automatic selector selects an untranscribed channel for the secretary when transcription of the recorder dictation is to be initiated.

As an alternative, in large installations in which a stenographic pool is used, the automatic selector may be replaced by manual controls in the hands, for instance, of the head of such a pool. If used in this manner, the master recorder may indicate such information as load or backlog of untranscribed dictation, the progress of each of the different secretaries or stenographers, and also those who are idle and ready for further work.

It is a further object of the invention to provide apparatus of the character above set forth and particularly to provide means to collect and record signals from an executive's unit and to relay said signals to a secretary's unit when the same is desired.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Figs. 1, 1a and 1b combine to comprise a schematic view of the present apparatus, showing the manner of electrical connection of the components thereof.

Fig. 2 is a top plan view of an executive's unit, the same being shown electrically in Fig. 1.

Fig. 3 is a broken end view of the mechanism shown in Fig. 2.

Fig. 4 is a front view of the mechanism shown in Fig. 3.

Fig. 5 is an enlarged fragmentary plan view of indicator details shown in Fig. 2.

Fig. 6 is an enlarged side elevational view thereof, the same being a cross-sectional view as taken on line 6—6 of Fig. 2.

Fig. 7 is a side elevational view, partly in section, of said executive's unit.

Fig. 8 is a cross-sectional view showing the indication portion of Fig. 7.

Fig. 9 is an enlarged end view as seen from the end of the unit opposite to that shown in Fig. 7 in another position.

Fig. 10 is a further enlarged and fragmentary detail view of a pawl and shaft assembly as used in both the executive's and secretary's units.

Fig. 11 is a side view of one of the pawls.

Fig. 12 is a front view, with parts broken away, of a master secorder unit.

Fig. 13 is an end view as seen from the left of Fig. 12.

Fig. 14 is a cross-sectional view as taken on line 14—14 of Fig. 12.

Fig. 15 is an end view as seen from the right of Fig. 12.

Fig. 16 is a fragmentary view showing how the tape of a recorder drives a unit of the present apparatus.

Fig. 17 is a schematic view of the general system of a multiplicity of components.

Figure 1:
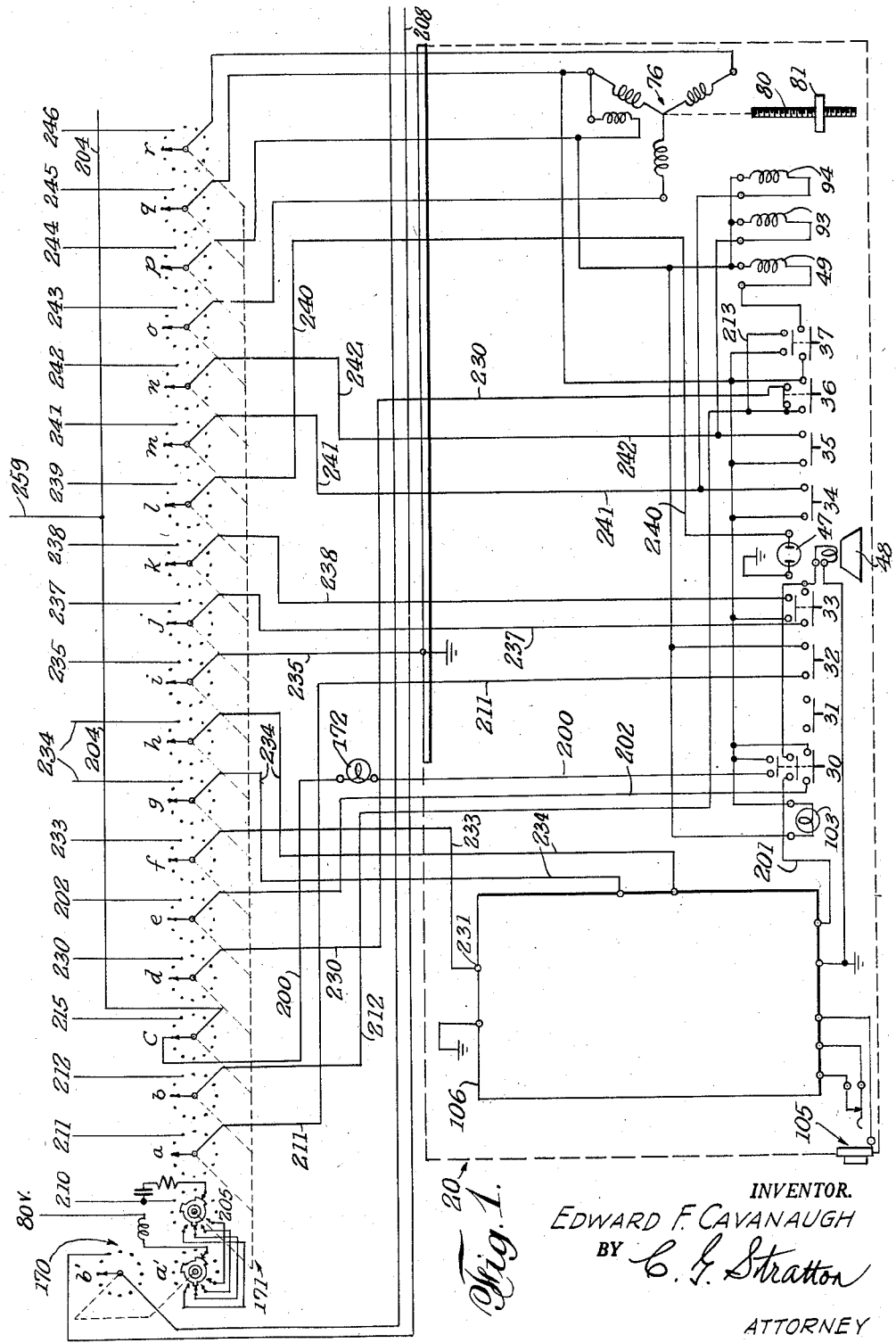

The remote control dictating, storing and transcribing apparatus that is illustrated comprises, generally, a dictator's or executive's unit 20, a transcriber's or secretary's unit 21, the latter including foot-controlled means 22, and a master recording unit 23.

The unit 20, shown best in Figs. 1 and 2 to 11, comprises a base frame 24 that is formed of a base plate 25, support posts 26 extending from said plate, a mounting plate 27 supported by said posts above base plate 25, and end plates or walls 28 disposed vertically on plate 27.

A switch 29 carried by plate 27 is provided with a series of switch-closing push buttons 30, 31, 32, 33, 34, 35, 36 and 37 that are best shown in Fig. 1. Said switches are normally open and are closed, selectively, by the respective switch keys 38, 39, 40, 41, 42, 43, 44 and 45. A dummy key 46 is located between keys 41 and 42 and the same is made translucent or transparent to show a light 47. Above the keys there is placed a speaker 48.

A solenoid 49 is carried by plate 27 and the floating core 50 thereof is connected to a bellcrank 51 pivoted at 52. The latter is connected to a vertical link 53 that is pulled downwardly when the solenoid is energized. Said link 53, through a horizontal connecting arm 54, rocks the pawl-clearing arms 55 and 56 on the respective shafts 57 and 58. The latter operate pawl-clearing bars 59 and 60 which are located rearward of a scale 61 that has a central longitudinal slot 62 on one side of which said scale is provided with length-indicating graduations 63, and on the other side with correction-indicating graduations 64.

Rearward of bars 59 and 60 there is provided a pair of pawl shafts 65 and 66, the same extending between walls 28. Bars 59 and 60 and scale 61 also extend between said walls 28. On shaft 65 is mounted a set of length-indicating pawls 67 and on shaft 66, a similar set of correction-indicating pawls 68. In connection with this construction, reference is made to Figs. 10 and 11 in which it is seen that the adjacent pawls are separated by washers 69 and that, while the pawls are freely rotational on their respective shafts, said washers are keyed as to a flat on each said shaft. A spring 70 lightly compresses the pawls and washers against a shoulder 71. This construction enables rocking movement of any of the pawls without affecting any of the others.

Each pawl is provided with a hooked end 72 that is in overstanding and registering association with the scale 61 and its graduations 63 and 64. As best seen from Fig. 6, said pawls are normally arranged with their hooked ends 72 outward of the longitudinal edges of scale 61 and are held in this position by limiting bars 73 and 74. In this manner, the tails 75 of said pawls more nearly approach each other, as shown.

On one wall 28 is mounted a servomotor 76 on the rotating shaft 77 of which is mounted a gear 78. A gear 79, in mesh with gear 78 has, as its shaft, a feed screw 80 that extends between walls 28. A feed block 81 is threadedly engaged with the feed screw to be moved longitudinally between walls 28. Guide rods 82 hold said block against rotation while so moving. In a seat 83 provided in block 81 there is located a pawl-actuating arm 84 that has its free end directed between the tails 75 of pawls 67 and 68. Said arm 84 is slidingly mounted as on a square shaft 85 journaled in walls 28 and provided on one end with an actuating cam 86.

Means are provided for flipping cam 86 in one direction or the other to, thereby, flip arm 84 to engage the tail of any pawl 67 or 68 that is aligned with said arm 84. Thus, upward movement of arm 84 will move one of the upper pawls 67 to bring its hooked end 72 inward as shown in Fig. 7 and into reading register with scale graduations 63. Downward movement of arm 84, in a similar manner, brings the hook of one of the lower pawls into reading register with graduations 64. Said means is best seen in Fig. 9 and comprises a pawl-actuating assembly 87 that is slidably mounted on retaining rivets 88 secured to one of the walls 28. Said assembly comprises a slotted bar 89 engaged with said rivets and a pair of oppositely formed pivoted dogs 90 carried by said bar. A spring 91 so biases said dogs that the ends 92 thereof are capable of being resiliently directed into engagement with actuating cam 86.

Said bar 87 is shifted in one direction or the other by means of solenoids 93 and 94 that have a common core 95. The latter is connected to bar 87 by a bent rod 96 that passes through a slot 97 provided in the wall mounting bar 87, as clearly shown in Fig. 9.

Except for the switch and key construction above described in connection with unit 20, the mechanism of unit 21 is substantially similar to the mechanism of unit 20. However, in unit 21, the switch 29 of unit 20 is replaced by a switch that has switch-closing push buttons 98, 99, 100, 101 and 102 that are shown in Fig. 1a. These switches are normally open and are closed by a comparable number of keys of the type hereinbefore described.

The unit 20 is provided, behind scale 61, which is preferably translucent, with a light 103. A similar light 104 is provided behind the scale of unit 21.

The dictation is given over a suitable microphone that may be connected to a jack 105 that leads into a suitable electronic amplifier 106 embodied in unit 20 and preferably located therein between plates 25 and 27.

In the present arrangement, switch button 30 is "dictate," button 31 "hold"; button 32 "reverse"; button 33 "listen"; button 34 "correction"; button 35 "length"; button 36 "forward"; and button 37 "off."

The recorded dictation is received in unit 21 either through speaker 107 or by a head set connected to jack 108.

The servomotor 109 of unit 21 and the solenoids 110, 111 and 112 are directly comparable to the respective solenoids 49, 93 and 94 and are provided for the same purpose as the latter.

The foot-controlled means 22, see Fig. 1a, embodies three foot switches 113, 114 and 115 that provide a forward, listen and reverse operation, respectively, for the secretary or transcriber.

The master recorder unit 23 is illustrated, in its mechanical form, in Figs. 12 to 15 and, electrically, is shown in Fig. 1*b*. Said unit—one of several used in the apparatus—comprises a base frame composed of a base plate 120, side walls 121 at the ends of the base plate, and an upper plate 122. Said plates and walls define an elongated space housing the hereinafter-described mechanism.

A solenoid 123 carried on the base plate 120, and linkage 124 operated thereby are directly comparable in structure and function to the pawl-clearing solenoid 49 and linkage of unit 20. This mechanism operates the pawl-clearing bars 125 and 126 to move the respective upper and lower banks or rows of pawls 127 and 128 on their respective shafts 129 and 130 from indicating position inward with respect to scale 131 to non-indicating outward position, as shown in Fig. 14.

A pawl-actuating arm 132, moved in a longitudinal path by a feed block 133, engages the tails of pawls 127 and 128 to move the same to indicating position from which position they are cleared by bars 125 and 126. A feed screw 134 feeds block 133, the same being driven, through gearing 135, by servo-motor 136 which is operated in synchrony by a servomotor 137 that is driven by the tape 138 of the generally conventional tape recording machine suggested at 160 of Fig. 17.

A shaft 139 rocks arm 132 to move selected pawls to indicating position and said shaft is rocked in one direction or the other by means 140 operated by solenoids 141 and 142 and their common floating core 143. The similarity of this pawl-moving means to that described in greater detail above will be readily seen.

A single-pole-single throw limit switch 144 is mounted on block 133 and is provided with an actuating roller 145 that tracks along the line of pawls 127 and, therefore, is actuated each time the same encounters a pawl that has been moved to indicating position. This switch is the length pawl switch. A similar limit switch 146 mounted on block 133 and provided with an actuating roller 147 that tracks along the correction pawls 128, is actuated by any such pawl that has been moved to correction-indicating position. This is the correction pawl switch.

A double-pole-double-throw forward limit switch 148 is carried by one end wall 121 of the frame and is actuated when encountered by block 133. A similar but reverse limit switch 149 is carried by wall 121 at the opposite end of the frame. Said latter wall is provided with openings 150 through which switches 144 and 146 project when the block moves in a direction to actuate switch 149.

The pawls 127 and 128 are provided with stops 151 that limit the non-indicating position of said pawls. Also, guide rods 152 hold block 133 against rotation while being fed by screw 134.

In addition to the above, the unit 23 includes a transcribe relay 153, a latching relay 154, a dictate relay 155, and a listen relay 156, purposes of these relays becoming more apparent hereinafter. Also, said unit may be provided with a dial light 157 to illuminate scale 131 from the rear. Solenoids 158 and 159 are respectively energized by switches 148 and 149.

As can be seen from Fig. 1, each relay above indicated controls a number of switch contacts and the same will be more fully understood from the description of the operation of the apparatus.

The executive's unit 20 and the master recording unit 23 are interconnected by a manual selector channel switch 170 and a solenoid-operated circuit selector switch 171. Also, a ready indicating pilot light 172 is provided. In a somewhat similar manner, the master recording unit 23 and the secretary's unit 21 are interconnected by a manual selector switch 173 and a solenoid-operated circuit selector switch 174. A light 175 to indicate completion of transcription may be provided.

A dial indicator 176, operating in slot 62 and carried by block 81, shows the progress of said block and arm 84 relative to pawls 67 and 68. A similar indicator 177 is provided in unit 23.

Dictation procedure (1) Executive presses "dictate" key 38 to indicate his desire to dictate. The automatic selector device selects a recorder unit 23 that is not in use and initiates operation of said unit. This lights up the indication light 47 in the executive's unit.

(2) The executive dictates into the microphone connected to jack 105 and the indicator 176 starts moving from left to right showing the minutes or other increments of time that are being used. At the end of the letter or other dictated material, the executive presses length key 43 energizing switch 35 and causing a pawl of the pawls 67 to drop into place in register with that graduation of graduations 63 that conforms to the time-length of said letter. This pawl indication is also set up in unit 23 by dropping of a pawl 127 that corresponds to the pawl dropped in unit 20.

(3) At this time, the executive may press the key 39 that controls the "hold" switch button 31 to arrest the progress of block 81 and afford opportunity to gather material for the next dictation. This also stops the master recorder which thus awaits further dictation.

(4) Resumption of dictation is instituted by again pressing key 38 and progress toward the right of blocks 81 (unit 20) and 133 (unit 23) proceeds. The executive may terminate, as before, by pressing key 43. If, however, he wishes to correct some portion of the dictation, he presses the key 42 that actuates connection switch 34. This causes a pawl from the series of pawls 68 to move into indicating position with respect to the graduations 64 of scale 61, thus indicating that what follows is a correction of what has preceded. A corresponding pawl 128 is moved to indicating position in unit 23. The correction is then dictated and received by the recorder. At the end of such correction indication, the dictation may be resumed.

(5) The executive may reverse the movement of the feed block and listen to dictation already given by again feeding forward and pressing key 41 to close switch 33.

At the end of all dictation, key 45 is pressed to actuate off switch 37.

Transcribing procedure

At any time after the executive has completed dictation, as indicated by extinction of light 172 of unit 23, the transcribing operation of the dictated material may be initiated.

(1) By pressing the key of unit 21 that closes switch 102, the secretary may begin the transcribing procedure. This automatically causes the pawls and scale on unit 21 to assume the set-up of the pawls and dial of unit 20.

(2) From the relationship of the first length pawl with respect to the upper graduations of the scale, the length of the first piece of dictation is determined and arrangements made to set the same properly on a sheet of paper.

(3) Straight transcription is readily accomplished by causing a forward movement of the units 21 and 23.

(4) Before beginning any letter in which a correction is noted by a lower pawl, the unit 21 is run forward rapidly by means of foot switch 113 while watching the indicator scale for the point of correction. The secretary then listens to the correction and then, knowing in which portion of the letter the correction or change is to be made, returns to the beginning and proceeds as above.

Dictating operation

This operation is instituted by depression of key 38 and actuation of switch button 30 of executive's unit 20.

This switch energizes light 172 in master control unit 23 through an off position on wafer c, by way of conductors 200, of the solenoid-operated channel selector switch 171. This switch also connects one side of speaker 48 by way of conductors 201. This switch further sets up a circuit to dictation relay 155 by way of conductors 202 and wafer e of selector switch 171.

Since each master recorder 23 is provided with a light 203 that is illuminated when said recorder is available for receiving and recording dictation, when light 172 is illuminated the operator selects an open channel by noting that said light 203 is illuminated through wafer c and conductors 204.

The foregoing is effected by setting wafer a' of switch 170 to set up control wafer 205 of selector switch 171. Also, wafer b' of the manual selector switch 170 energizes a time delay relay 206, across the 110 v. power line 207, through conductor 208. At the end of a two-second interval, said relay is energized to close contacts 209 to provide power to the solenoid-operated channel selector switch 171 through conductors 210.

When said switch 171 is operated, the control wafer 205 thereof determines the channel selected by the predetermined setting of the manual channel selector switch 170. Thus set, wafer a of switch 170 connects one side of reverse solenoid 159 to one side of dictator's reverse button 32 through conductors 211; wafer b connects one side of forward solenoid 158 to one side of dictator's forward button 36 through conductors 212, and to one side of dictator's off button 37 through conductor 213; and wafer c energizes dictating light 214 through conductors 215 and normally-closed contact 216 of transcribe relay 154. Wafer c also energizes the reverse solenoid 159 through the normally-closed contact 217 of latching relay 154 and the normally-closed contacts of reverse limit switch 149 through conductors 218 and 215.

Through motor 137, solenoid 159 reverses the tape 138 in the recorder 160 until the normally-open contacts of limit switch 149 or length pawl switch 144 are closed to energize the latch coil of latching relay 154. This is accomplished through conductors 219.

When the relay 154 is latched it acts to disconnect the 24 v. circuit from the reverse solenoid 159 and attach the same to one side of the dictate relay 155 and forward solenoid 158. The relay 155 is energized through wafer e of switch 171 and conductors 202 and 219, normally-open contacts 220 of relay 154 and through wafer c.

The following functions result. The dictate relay 155 energizes a solenoid in the recorder 160 by effecting connection of conductors 221 and 222; ungrounds wire 223 on tone control in the recorder and grounds wire 224; puts positive current on one of the electronic tubes in the recorder by connecting wires 225 and 226; disconnects the record coil conductor 227 from the listen input conductor 228 and connects the former to conductor 229 of the amplifier output of the recorder; and ungrounds conductors 229 and 228.

The wafer d of switch 171 connects one side of relay 153 to one side of off button 37 through the normally-closed contacts of the dictator's forward button 36 and conductors 230; wafer e connects one side of dictate button 30 to one side of dictate relay 155 by conductors 202, as above described; wafer f connects the output 231 of dictator's amplifier 106 to input conductor 232 of the recorder 160 through conductors 233; wafers g and h connect line current to said amplifier 106 through conductors 234; wafer i grounds the chassis of units 20 and 23 through conductors 235; wafer j connects the output conductor 236, through conductors 237, to the normally-open contacts of listen button 33; wafer k connects one side of said listen button to one side of the listen relay 156 through conductors 238; wafer l connects conductor 239 from one side of the light in recorder 160 to one side of the light 47 of unit 20 through conductor 240; wafer m connects one side of correction solenoid 141 to one side of the correction button 34 of unit 20 through conductors 241; wafer n connects one side of length solenoid 142 to one side of the length button 35 through conductors 242; and wafers o, p, q and r connect servo motors 136 and 137 in the master recorder unit 23 to the servo motor 76 in the executive's or dictator's unit 20 through conductors 243, 244, 245 and 246.

The 24 v. current used in unit 20 may be taken from wafers 11 and 12. Also, the dial light 103 may be energized from said wafers.

If there is to be an interruption in dictation, the hold button 31 is pressed and the same releases dictate button 30, thereby de-energizing dictate relay 155 of the master unit 23. This stops the operation of the recorder 160 and allows the dictator to hold the channel without dictating. By again pushing dictate button 30, the apparatus is connected for recording dictation as above.

If the dictator wishes to play back all or some of the dictation to listen to the same, the procedure is as follows:

The reverse button 32 is operated. Actuation of this button also releases the dictate button 30 and, if the hold button is on, it releases the latter also. As above, dictate relay 155 is de-energized. Through wafer a of selector switch 171 and reverse limit stop switch 149, the reverse solenoid 159 is energized to run the tape 138 in the recorder 160 rapidly in reverse.

As the indicator 176 traverses backward, the dictator, watching closely, releases the reverse button 32 when he believes sufficient tape in the recorder has been reversed and presses the listen button 33.

This operation energizes listen relay 156 through wafer k and also connects speaker 48 in the dictator's unit 20 to the output 236 of the recorder 160 through wafer j of switch 171. Said relay 156 energizes the mentioned relay in the recorder by closing contacts 247 connecting conductors 221 and 222; disconnects conductor 232, the output of amplifier 106, from an input conductor 248 by opening switch 249 and grounding said conductor 232 as at 250; disconnects input conductor 251 from ground 250 by opening switch 252 and connecting the same to input conductor 248 by means of switch 253; disconnects from said ground the conductor 254 that leads to the erase transformer of the recorder 160 by opening switch 255; and grounds conductor 256 through switch 257, the same being one side of the listen amplifier output transformer of said recorder 160.

The lamp 47 is preferably of the gaseous discharge type and is so connected to the similar light in recorder 160 as to glow with an intensity according to the audio level for proper recording. Thus, said lamp should be watched to insure the proper audio level.

When correction button 34 is actuated, the same, through wafer m, momentarily energizes the correction solenoid 94 of unit 20 and correction solenoid 141 of unit 23. These two solenoids—one through the means 87 and the other through the means 140—move one of the pawls 68 and one of the pawls 128 in indicating position with respect to the correction graduations of the respective scales 61 and 131. Thus, both the unit 20 and the unit 23 will have a correction pawl in a certain position along the scale thereof and the position of one pawl will conform to the position of the other.

At the end of a piece of dictation, the length thereof is indicated by pressing length button 35 which, through wafer n, momentarily energizes the length solenoid 93 of unit 20 and the length solenoid 142 of unit 23. In a manner similar to that described in the paragraph next above, one pawl of the respective length pawls 68 and 127 is moved to indicating position relative to the respective scales 61 and 131.

Needless to say, more than one correction may be indicated by the movement of two or more correction pawls to indicating position. Similarly, two or more pieces of dictation may have their termination indicated by a conforming number of length pawls.

The dictator, when listening back, wishes to disregard some of the dictation and move rapidly to a position further along. In such case, the actuates forward button 36 to move indicator 176 to a position desired. Button 36 has momentary spring loading and disengages all other buttons that may have been actuated. When actuated, button 36, through its normally-open contacts, energizes forward solenoid 158 through wafer *b* of switch 171 and the normally-closed contacts of forward limit stop switch 148 and normally-open contacts of latching relay 154 and wafer *c*. The normally-closed contacts of forward button 36 are, thereby, opened to open the circuit to the to be transcribed relay 153.

When all dictation has been terminated, off button 37 is actuated to momentarily energize clear solenoid 49, the same, through linkage connected to bars 59 and 60, restores all correction and length pawls that have been moved to correction and length positions to their initial non-indicating position, as, for example, in Fig. 6. The indicating correction and length pawls of unit 23, however, remain in the positions to which moved.

Button 37 also momentarily energizes to be transcribed relay 153 through normally-closed contacts of forward button 36 and wafer *l* of switch 171. This relay 153 holds itself energized through wafer *c*; energizes light 258 on a front panel of the master unit 23 through conductors 259 and switch contacts 260 of said relay; de-energizes dictating light 214 located on said panel by opening switch contacts 216; and opens the circuit to the "channel open" light 203 through opening of switch contacts 261 of relay 153.

The off button 37 also energizes forward solenoid 158 through wafer *b* of switch 171, the normally-closed contacts of forward limit switch 148, the normally-open contacts of latching relay 154 and wafer *c* of switch 171. This drives the recording tape forwardly and when the indicator 176 reaches the right end of scale 61, the normally-open contacts of the forward limit switch 148 and the closed energizing reset coil 262 of latching relay 154 open the circuit to forward solenoid 158.

When the attendant of unit 23 sees to be transcribed light 258 and after the indicator 177 of said unit has reached the right end of scale 131, the manual selector switch 170 is turned or moved to off position. The solenoid-driven channel selector switch 171 follows switch 170 to off position and performs as follows: wafer *a* disconnects one side of reverse solenoid 159 from one side of the reverse button 32; wafer *b* disconnects one side of forward solenoid 158 from one side of forward button 36; wafer *c* de-energizes dictating light 214 and disconnects power from one side of reverse solenoid 159; wafer *d* disconnects one side of to be transcribed relay 153 from one side of off button 37; wafer *e* disconnects one side of dictate button 30 from one side of dictate relay 155; wafer *f* disconnects output of amplifier 106 from input conductor 232 to the amplifier of recorder 160 through normally-closed contacts of listen relay 156; wafers *g* and *h* disconnect the 110 v. current in line 207 from amplifier 106; wafer *i* disconnects dictator unit chassis from master unit chassis; wafer *j* disconnects output conductor 229 of the amplifier of recorder 160 from one side of speaker 48; wafer *k* disconnects one side of listen button 33 from one side of listen relay 156; wafer *l* disconnects conductor 239 from one side of the light in said recorder from one side of the light 47 in unit 20; wafer *m* disconnects one side of correction solenoid 141 in the master unit 21 from one side of the correction button 34 in dictator's unit 20; wafer *n* disconnects one side of length solenoid 142 in the master unit from one side of the length button 35 in the dictator's unit; and wafers *o*, *p*, *q* and *r* disconnect servomotors 136 and 137 from servomotor 76 and also de-energize dial light 103.

While the dictator's unit has been separated electrically from recording unit 23, the latter has stored therein not only the dictation, but also the length of the different pieces of dictation and also the location and the subject matter of any corrections that have been made in the dictation. In other words, unit 23 has available for use by unit 21 all such information.

*Transcribing operation*

The attendant of the master recorder 23 selects a secretary's unit 21 for transcribing channel by turning operator's manual secretary selector switch 173, after first making sure that the dictator's unit 20 has been disconnected as above indicated. Wafer A' of switch 173 sets up control wafer 263 of the solenoid-driven secretary selector switch 174. Operator's manual secretary selector switch has a wafer B' that energizes the time delay relay 206 through conductor 264. At the end of a two-second interval, the relay 206 closes switch 209 to provide power for solenoid-operated selector switch 174 through conductors 210.

When switch 173 is operated, the control wafer 263 thereof determines the secretary's unit 21 selected by the predetermined setting of the operator's manual secretary selector switch 173. Thus set, wafer A connects one side of secretary's reverse foot control switch 115 to one side of reverse solenoid 159 through conductors 265 and 211; wafer B connects one side of secretary's listen foot control switch 114 to one side of listen relay 156 through conductors 266 and 238; wafer C opens the circuit to open channel light 203; wafer D connects one side of secretary's forward foot control switch 113 to one side of forward solenoid 158 through conductors 267 and 212; and wafer E connects the center 268 of the single pole-double throw headset switch 269 in headset jack 108 to the output 237 of the amplifier of recorder 160 through conductors 270.

The normally-closed contacts of switch 269 connect the mentioned output 237 to one side of speaker 107. When a headset is inserted into jack 108, the circuit to speaker 107 is broken by movement of center contact 268 and the output 237 is connected through an impedance-matching transformer 271 to said headset.

The wafer F of switch 174 connects one side of volume-attenuating buttons 98, 99, 100 and 101 to the input grid of a tube in recorder 160 through conductors 272. Volume-attenuating resistors 273, 274 and 275 are connected to one side of the buttons 98 to 101 and are used to replace volume control usually provided in the recorder amplifier.

The wafer G of switch 174 connects the chassis of the secretary's unit 21 and that of the master recording unit 23 by grounded conductors 276 and 235; wafer H connects one side of correction solenoid 111 to one side of correction pawl switch 146 through conductors 277; wafer I connects one side of length solenoid 112 to one side of normally-open contacts of length pawl switch 144 through conductors 278; and wafers J, K, L, and M connect servomotor 109 to servomotors 136 and 137.

Wafers K and L connect 24 v. current to unit 21 and energize dial light 104.

The wafer N of switch 174 opens the circuit connecting the normally-open contacts of length pawl switch 144 in parallel with the normally-open contacts of reverse limit switch 149. This allows the latter switch to stop reverse travel of tape 138 when connected to secretary's unit 21, whereas said switch 149 and length pawl switch 144 both would initially limit reverse travel when connected to the dictator's or executive's unit 20.

The wafer O of switch 174 connects one side of transcribing completed light 175 to one side of secretary's complete button 102 through conductors 279; and wafer P connects one side of reverse solenoid 159 to 24 v. current through wafer K, conductors 280, 244' 244, 281, 218', 218, switch 222, and conductor 211. The normally-closed contacts of reverse limit switch 149 are connected through conductors 245 and 218 to the other side of said 24 v. current line. The reverse solenoid 159 reverses tape 138 until normally-open contacts of reverse limit switch 149 are closed and energize the latch coil 262 of latching relay 154. When said relay 154 is latched, it disconnects 24 v. from the reverse solenoid 159 and attaches the same to one side of the dictate relay 17 and forward solenoid 158. Also, the same disconnects 24 v. from one side of open channel light 203.

When the solenoid-operated secretary's selector switch 174 has been indexed and has started tape 138 in reverse direction, the length pawl switch 144 is actuated by and at the same time resets, every length pawl 127 that has been set by the dictator during dictation. The roller 145 not only actuates switch 144 but also resets pawls from indicating to non-indicating position. Said switch 144, when actuated, energizes length solenoid 112 through wafer I and conductors 278. The correction pawl switch 146, in a similar manner through the medium of its roller 147, resets all of the correction pawls 128 and, through wafer H and conductors 277, energizes correction solenoid 111.

When the secretary desires to transcribe, she presses listen foot control switch 114, which energizes listen relay 156 through wafer B of switch 174. The function of this relay has been described in connection with the listen button 33 of the executive's unit 20 and is the same when switch 114 is pressed. When said switch is released, relay 156 is de-energized and tape 138 stops moving.

When a change in volume of output is desired, one or the other of the switch buttons 98, 99, 100 or 101 is pressed to vary the resistance and, therefore, the volume of sound.

When the tape 138 is to be reversed, foot switch 115 is pressed to energize reverse solenoid 159 through wafer A of switch 174 and normally-closed contacts of reverse limit switch 149. The tape stops reverse travel when switch 115 is released.

Rapid forward movement of the tape 138 is effected by pressing foot switch 113 which energizes forward solenoid 158 through wafer D, the normally-closed contacts of forward limit switch 148, the normally-open contacts of the latching relay 154, and wafer P. Solenoid 158 is de-energized and tape 138 stops when switch 113 is released.

When the secretary has completed transcribing, she presses foot switch 113 and holds the same depressed until the indicator moving along the scale of unit 21 has reached the extreme right and stops moving. Block 133 will actuate forward limit switch 148. Now, the secretary presses the complete button 102 to energize clear solenoid 110 which, in the manner described for clear solenoid 49, returns all pawls to non-indicating condition. Button 102 also energizes transcribing complete light 175 through wafer O.

When the attendant at the master recorder sees light 175 illuminated, she turns manual selector switch 173 to off position and the latter, automatically, causes solenoid-controlled switch to follow to off position, performing the following: wafer A disconnects one side of reverse solenoid 159 from one side of reverse foot switch 115; wafer B disconnects one side of listen relay 156 from one side of foot switch 114; wafer C energizes reset coil 262 of latching relay 154 through normally-open contacts of forward limit switch 148 and completes the circuit to light 203 through the normally-closed contacts of the to be transcribed relay 153 and the normally-closed contacts of latching relay 154; wafer D disconnects one side of forward solenoid 158 from one side of foot switch 113; wafer E disconnects center 268 of headset switch 269 from output 237 of the amplifier of recorder 160; wafer F disconnects volume-attenuating buttons 98 to 101 from the input of said recorder; wafer G disconnects the ground connections of the chassis of units 21 and 22; wafer H disconnects one side of correction solenoid 111 from one side of correction pawl switch 146; wafer I disconnects one side of length solenoid 112 from one side of length pawl switch 144; wafers J, K, L and M disconnect servomotor 109 from servomotors 136 and 137; wafers K and L also de-energize dial light 104; wafer N closes the circuit connecting length pawl switch 144 with reverse limit switch 149; wafer O opens the circuit from complete button 102 to transcribing completed light 175; and wafer P disconnects one side of reverse solenoid 159 from 24 v. current.

The above describes one executive's unit 20 and its manner of connection with one recording unit 23; and one secretary's unit 21 and its manner of connection with said one recording unit. From the diagrammatic showing of Fig. 17 it will be clear how any one of several units 20 and 21 may be connected to a selected unit 22 of a group of such units.

The conductor 300 constitutes the opposite side of the 80 v. line and conductors 301 and 302 connect the normally-open contacts of switches 144 and 149.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. Dictating apparatus comprising a dictator's unit provided with dictation length-indicating and correction-indicating means, a recording unit provided with similar means, said means being visible in each unit electro-mechanical means operatively connecting the units to set the length-indicating and correction-indicating means of the recording unit in conformance with the setting of the similar means of the dictator's unit, and sound-track means to record the dictation; said latter means driving the mentioned electro-mechanical means.

2. Apparatus according to claim 1: said indicating means in both units comprising rows of pivotable pawls having indicating ends, and time scale means adjacent said ends and relative to which said pawl ends are movable, said time scale means providing a visible record of the dictation.

3. Apparatus according to claim 1: said indicating means in both units comprising rows of pivotable pawls having indicating ends, time scale means adjacent said ends and relative to which said pawl ends are movable, said time scale means providing a visible record of the dictation, and means controlled from the dictator's unit to restore the pawls of the latter unit to non-indicating from indicating position.

4. Apparatus according to claim 1: said indicating means in both units comprising rows of pivotable pawls having indicating ends, time scale means adjacent said ends and relative to which said pawl ends are movable, said time scale means providing a visible record of the dictation, means controlled from the dictator's unit to restore the pawls of the latter unit to non-indicating from indicating position, and the mentioned electro-mechanical means comprising a pair of servomotors to drive the indicating means of the recording unit in synchrony with the indicating means of the dictator's unit.

5. Dictating, recording and transcribing apparatus comprising a dictator's unit provided with length-indicating and correction-indicating means, a recording unit and a transcribing unit each provided with similar means, electro-mechanical means operatively connecting the dictator's and recording units to set the length-indicating and correction-indicating means of the recording unit according to the setting of the similar means of the dictator's unit, and second electro-mechanical means operatively connecting the transcriber's and recording unit to set the length-indicating and correction-indicating means of the transcriber's unit according to the setting of the similar means of the recording unit, each electro-mechanical means being driven by the sound-track of the respective units.

6. Apparatus according to claim 5: said indicating means of each said dictator's, recording and transcriber's units comprising pivoted rows of pawls having indicating ends, and time scale means adjacent said ends and relative to which said pawl ends are movable to provide a visible record of the dictation.

7. Apparatus according to claim 5: said indicating means of each said dictator's, recording and transcriber's units comprising pivoted rows of pawls having indicating ends, time scale means adjacent said ends and relative to which said pawl ends are movable to provide a visible record of the dictation, and means to restore the pawls of each said unit from indicating to non-indicating position.

8. Apparatus according to claim 5: said recording unit having a moving record element, means movable along the rows of pawls and driven by said record element, and a member carried by the latter means and movable to engage a registering pawl to shift the same to indicating position.

9. Apparatus of the character described, comprising a dictator's unit embodying means to receive dictation, record the length thereof and record corrections therein, a master recording station comprising a record-producing unit to receive and record the dictation introduced into the dictator's unit, means in said station to collect signals transmitted by the dictator's unit and record the same according to the length of and corrections in said dictation, and a transcriber's unit embodying means to reproduce dictation recorded in the master recording station and to collect and record signals transmitted by said station with respect to the length and corrections in said dictation, said recording unit being capable of having operative connection to a plurality of dictators and transcribers units at one time.

10. Apparatus of the character described, comprising a dictator's unit embodying means to receive dictation, record the length thereof and record corrections therein, a master recording station comprising a record-producing unit to receive and record the dictation introduced into the dictator's unit, means in said station to collect signals transmitted by the dictator's unit and record the same according to the length of and corrections in said dictation, manually-controlled means in the dictator's unit to provide a signal in the master recording unit that dictation is desired, and a transcriber's unit embodying means to reproduce dictation recorded in the master recording station and to collect and record signals transmitted by said station with respect to the length and corrections in said dictation, said recording unit being capable of having operative connection to a plurality of dictators and transcribers units at one time.

11. In apparatus of the character described, the combination comprising indicating means having two sets of aligned pawls arranged in parallel rows and provided with indicating ends, a scale disposed between the indicating ends of said rows of pawls, and means to move a selected pawl from each row in a direction to bring its indicating end into operative association with said scale, said second means comprising a travelling block carrying a transversely movable member, and means to move said member to pawl-moving position.

12. In apparatus of the character described, the combination comprising indicating means having two sets of aligned pawls arranged in parallel rows and provided with indicating ends, a scale disposed between the indicating ends of said rows of pawls, and means to move a selected pawl from each row in a direction to bring its indicating end into operative association with said scale, a member movable to selectively move the pawls of one row or the other, and separate manually-operable controls for said member.

13. In apparatus of the character described, the combination comprising indicating means having two sets of aligned pawls arranged in parallel rows and provided with indicating ends, a scale disposed between the indicating ends of said rows of pawls, means to move a selected pawl from each row in a direction to bring its indicating end into operative association with said scale, said scale having a longitudinal slot between the opposite longitudinal edges thereof, and a pointer carried by the pawl-moving means and readable in connection with said scale.

14. In dictating and transcribing apparatus having a plurality of electrical circuits, the combination comprising a length-indicating and correction-indicating scale, a plurality of pivotally mounted pawls adjacent said scale, said pawls having indicating ends adapted to move relative to said scale, means to pivot said pawls and move the ends thereof into indicating position in respect to said scale, and means to pivot said pawls to move the ends thereof into non-indicating position, each pawl pivoting means being connected to one of said plurality of electrical circuits.

15. In dictating and transcribing apparatus according to claim 14 in which the pawls are arranged in two rows, one row of pawls being mounted adjacent one side of said scale, the other row of pawls being mounted adjacent the other side of said scale, and each pawl pivoting means being located inbetween the two rows and adapted to pivot the pawls in either row.

16. In dictating and transcribing apparatus having a plurality of electrical circuits, the combination comprising a length-indicating and correction-indicating scale, two rows of pawls on one row having a plurality of pivotally mounted pawls adjacent one side of said scale, a second row having a plurality of pawls, pivotally mounted adjacent the other side of said scale, all of said pawls having indicating ends adapted to be moved relative to said scale, a first pawl-pivoting means adapted to move said ends into indicating position in respect to said scale, said means being movable along said rows of pawls and adapted to move individual pawls in either row, and a second pawl-pivoting means adapted to move said ends into non-indicating position, each pawl-pivoting means being connected to one of said plurality of electrical circuits.

17. In dictating and transcribing apparatus according to claim 16 in which the said scale is provided with a longitudinal slot, a pointer arm extending through said slot and connected to said first pawl-pivoting means and movable therewith along the scale.

18. In dictating and transcribing apparatus having a servomotor and a switch interconnecting a plurality of electrical circuits, the combination comprising a length-indicating and correction-indicating scale, a row of pivotally mounted pawls adjacent one side of said scale, a second row of pivotally mounted pawls adjacent the other side of said scale, all of said pawls having indicating ends adapted to be moved relative to said scale, a feed screw mounted adjacent said scale and longitudinally parallel thereto, said feed screws being rotated by said servomotor, a block mounted on said feed screw and adapted to be moved therealong relative to said scale, an arm pivotally mounted on said block and directed toward said scale, said arm being located inbetween the two rows of pawls, and means connected to one of said plurality of electrical circuits to pivot said arm and, thereby, move one of said pawls into indicating position in respect to said scale.

19. In dictating and transcribing apparatus according to claim 18 in which is provided additional means connected to another one of said plurality of electrical circuits and adapted to move all of the pawls previously moved into indicating position into non-indicating position.

20. In dictating and recording apparatus having a plurality of electrical circuits, the combination comprising a dictator's unit, a recording unit remote from said dictator's unit, a length-indicating and correction-indicating scale on each of said units, a plurality of pawls pivotally mounted adjacent each of said scales, all of said pawls having indicating ends adapted to move relative to said scales, means attached to said dictator's unit to pivot the pawls thereof, said means being connected to one of said plurality of electrical circuits and adapted to pivot like pawls on the recording unit, each of the pawls thus pivoted having its ends moved into indicating position in respect to said scales, and means attached to the dictator's unit to move the pawls of each of said units into non-indicating position, said latter means also being connected to one of said plurality of electrical circuits.

21. In dictating and recording apparatus according to claim 18 in which the pawls are arranged in two rows in each of said units, one row of pawls being mounted adjacent one side of said scale, the other row of pawls being mounted adjacent the other side of said scale, and each pawl pivoting means being located inbetween the two rows and adapted to pivot the pawls in either row.

22. In dictating and recording apparatus having a plurality of electrical circuits, the combination comprising a dictator's unit, a recording unit remote from said dictator's unit, a length-indicating and correction-indicating scale on each of said units, a row of pivotally mounted pawls adjacent one side of each of said scales, a second row of pivotally mounted pawls adjacent the other side of said scales, all of said pawls having indicating ends adapted to be moved relative to said scales, a first pawl-pivoting means attached to the dictator's unit to pivot individual pawls in either row of said units, said means being connected to one of said plurality of electrical circuits and adapted to pivot like pawls on the recording unit, each of the pawls thus pivoted having its ends moved into indicating position in respect to said scales, and second pawl-pivoting means attached to the dictators unit adapted to move any pawl on said unit previously pivoted into indicating position into non-indicating position, said latter means being connected to another one of said plurality of electrical circuits and adapted to also move any pawl on said recording unit previously pivoted into indicating position into non-indicating position.

23. In dictating and recording apparatus having a servomotor and a switch interconnecting a plurality of electrical circuits, the combination comprising a dictator's unit, a recording unit remote from said dictator's unit, a length-indicating and correction indicating scale on each of said units, a row of pivotally mounted pawls adjacent one side of each of said scales, a second row of pivotally mounted pawls adjacent the other side of said scales, all of said pawls having indicating ends adapted to be moved relative to said scales, a feed screw in each of said units mounted adjacent the scales thereof and longitudinally parallel thereto, means to rotate the feed screw of the recording unit in synchrony with the feed screw of the dictator's unit, a block mounted on each one of said feed screws and adapted to be moved therealong relative to said scales, an arm pivotally mounted on each of said blocks and directed toward said scales, said arms being located inbetween the two rows of pawls of each unit and adapted to pivot individual pawls in either row, and means attached to the dictator's unit and connected to one of said plurality of electrical circuits to pivot the arm of said unit and, thereby, move one of the pawls of that unit into indicating position in respect to the scale of said unit, said latter means also moving a corresponding pawl on the recording unit into indicating position in respect to the scale of that unit.

24. In dictating and recording apparatus according to claim 23, additional means being provided and attached to the dictator's unit and connected to another one of said plurality of electrical circuits to move all the pawls of that unit previously pivoted into indicating position into non-indicating position, said additional means being arranged to move all the pawls of the recording unit previously pivoted into indicating position into non-indicating position.

25. In dictating and recording apparatus according to claim 23 in which each of said scales is provided with a longitudinal slot, pointer arms extending through said slots, means connecting said pointer arms to the arms in the blocks of each unit and movable therewith along their respective scales.

References Cited in the file of this patent

UNITED STATES PATENTS

| Number | Name | Date |
|---|---|---|
| 767,453 | Summers | Aug. 16, 1904 |
| 1,993,870 | Belliveau | Mar. 12, 1935 |
| 2,066,672 | Berard | Jan. 5, 1937 |
| 2,200,351 | Whitehead | May 14, 1940 |
| 2,333,235 | Clausen | Nov. 2, 1943 |